United States Patent [19]

Feger et al.

[11] Patent Number: 5,288,842

[45] Date of Patent: Feb. 22, 1994

[54] MORPHOLOGICAL COMPOSITE MATERIALS FORMED FROM DIFFERENT PRECURSORS

[75] Inventors: Claudius Feger, Hopewell Junction; Rodney T. Hodgson, Ossining; David A. Lewis, Carmel; Ravi Saraf, Croton-on-Hudson, all of

[73] Assignee: International Business Machines Corporation, Armonk, N.Y.

[21] Appl. No.: 647,957

[22] Filed: Jan. 30, 1991

[51] Int. Cl.$^5$ .................. C08G 69/26; B32B 27/00
[52] U.S. Cl. .................... 528/335; 528/59; 528/67; 528/129; 528/152; 528/159; 528/350; 528/351; 528/353; 526/346; 526/347; 526/347.2; 525/432; 525/481; 525/524; 525/526; 428/413; 428/423.1; 428/429; 428/473.5; 428/500; 264/231; 264/236; 264/331.11
[58] Field of Search .................... 264/231, 236, 331.11; 528/152, 159, 59, 67, 129, 350, 170, 176, 220, 229, 351, 353, 335; 525/432, 481, 524, 526; 526/346, 347, 347.2; 428/413, 423.1, 429, 500, 473.5

[56] References Cited

U.S. PATENT DOCUMENTS

| | | | |
|---|---|---|---|
| 3,179,614 | 4/1965 | Edwards | 528/125 |
| 3,361,589 | 1/1968 | Lindsey | 528/125 |
| 3,554,935 | 1/1971 | Knapp et al. | 521/185 |
| 3,620,902 | 11/1971 | Anderson et al. | 428/429 |
| 3,770,573 | 11/1973 | Dunphy et al. | 161/227 |
| 3,939,242 | 2/1976 | Lundberg et al. | 264/101 |
| 4,012,555 | 3/1977 | Keske | 428/383 |
| 4,051,217 | 9/1977 | Lundberg et al. | 264/230 |
| 4,107,125 | 8/1978 | Lovejoy | 525/183 |
| 4,378,400 | 3/1983 | Makino et al. | 428/220 |
| 4,387,184 | 6/1983 | Coquard et al. | 525/183 |
| 4,404,317 | 9/1983 | Epstein et al. | 524/538 |
| 4,477,598 | 10/1984 | Kesting | 521/62 |
| 4,515,924 | 5/1985 | Brooks et al. | 525/432 |
| 4,532,316 | 7/1985 | Henn | 528/59 |
| 5,026,789 | 6/1991 | Weber et al. | 525/423 |
| 5,244,946 | 9/1993 | Guest et al. | 524/86 |

OTHER PUBLICATIONS

Polymer Preprints, vol. 31, No. 1, Apr. 1990, pp. 613-615 Moonhor Ree et al. "Polyimide Molecular Composites Via In-Sito Rod Formation".
Chemical Patents Index, Documentation Abstracts Journal, Section Ch, Week 8923 Aug. 2, 1989, & JP-A-1 110 535 Apr. 27, 1989 & Patent Abstracts of Japan vol. 13, No. 331 (C-622) Jul 25, 1989.

(List continued on next page.)

*Primary Examiner*—John Kight, III
*Assistant Examiner*—P. Hampton-Hightower
*Attorney, Agent, or Firm*—Scully, Scott, Murphy & Presser

[57] ABSTRACT

A method of producing a multiphase polymer is disclosed whereby the phases have the same chemical structure but have different morphological states and thus different properties. This is achieved by forming a mixture of precursors of the polymer, at least one of the precursors having a reaction rate higher than the other precursor or precursors in the mixture. The precursor having the highest reaction rate is then converted to obtain a composite of a polymer and the precursors that are not polymerized. This mixture might also be formed by mixing a soluble polymer with its precursor. The polymer/precursor composite is processed to obtain the structure having different morphological states by either choosing the reaction conditions to convert the unconverted different morphological states by either choosing the reaction conditions to convert the unconverted precursors such that the obtained polymer differs in it morphology/ properties from the first obtained polymer or by applying stress to the composite and then converting the still unreacted precursor or precursors in the composite such that different morphological states are obtained.

33 Claims, No Drawings

OTHER PUBLICATIONS

Chemical Patents Index, Basic Abstracts Journal, Section Ch, Week 8802, Mar. 9, 1988 & JP-A-62 270 622 (Nippon Teleg & Teleph) Nov. 25, 1987 & Patent Abstracts of Japan, vol. 12, No. 159 (C-495) May 14, 1988.

Bell, et al., J. Poly. Sci.: Poly. Chem. Ed., 14, 2275-92 (1976).

Mita, et al., *High Modulus, High Strength Polyimides*, in "Polyimides: Materials, Chemistry and Characterization," 1-12 (Feger, et al. Eds. 1989).

Takekoshi, *Other Synthetic Routes to Polyimides*, in "Polyimides," 39-57 (Wilson, et al. eds. 1990).

Yokota, et al., *High Modulus, High Strength Polyimide/Polyimide Molecular Composite Films*, in "Polyimides: Materials, Chemistry and Characterization," 13-25 (Feger, et al. eds. 1989).

Kirk-Othmer, *Encyclopedia of Chemical Technology*, 9, 267-90 (3d ed. 1980).

Kirk-Othmer, *Encyclopedia of Chemical Technology*, 18, 564 (3d ed. 1982).

MORPHOLOGICAL COMPOSITE MATERIALS FORMED FROM DIFFERENT PRECURSORS

DESCRIPTION

1. Technical Field

The technical field to which the invention relates is a method and a new class of polymer composites produced by such methods including blends or molecular composites, which exhibit multiphase structure where the phases are of the same chemical structure but have different morphologies such as crystallinity and the like.

2. Prior Art

Precursor polymers which can be processed because they are soluble or formable can be converted to their final polymer form after some pre-processing such as application, drying, form filling and the like and upon conversion to the final polymer may be insoluble and infusible. Blends of two or more polymers can be made by mechanically mixing the polymers in a high shear mixer such as a sigma blade mixer or a Banbury mixer or such blends can be obtained by mixing miscible or immiscible solutions of the polymers followed by either drying the solution or co-precipitating the polymers to obtain a blend of the polymers which in most cases has mechanical properties which is a compromise of the properties of each individual property.

It is also known that polyimide blends can be made by dissolving two or more polyamic acid precursors in a solvent and subsequently casting films from the solution and curing the films. The resultant product is more or less a block co-polymer since the precursors undergo exchange reactions. True blends cannot be obtained in this way.

Polymerization processes can be divided into condensation polymerization and addition polymerization which are also described respectively as, step-reaction and chain-reaction polymerization. Condensation or step-reaction polymerization is analogous to condensation of low molecular weight compounds where two polyfunctional molecules are reacted to produce one larger polyfunctional molecule with the possible elimination of a small molecule such as water. Addition, or chain-reaction polymerization, utilizes a chain carrier which may be an ion or a reactive substance with one unpaired electron, i.e. a free radical. The free radical can react to open the double bond of a vinyl monomer and adding to it, with an electron remaining unpaired. In a relatively short time, many more monomers will be added successively to the polymer chain.

It is known that step-reaction polymers such as poly(ethylene terephthalate) filaments can be oriented in a two-stage drawing process where such orientation increases the crystallinity and significantly improves tensile strength, modulus, heat resistance and gas barrier properties. (Kirk-Othmer, *Encyclopedia of Chemical Technology*, 3rd. Ed., Vol. 18, p. 564).

Knapp et al. U.S. Pat. No. 3,554,935 describes a method for manufacturing polyimide foams from a mixture of a so-called "A-staged" polyimide resin and a "B-staged" polyimide resin admixed with one another which is heated whereby foaming occurs with the polymerization of the A-staged system. The A-staged product comprises a friable molecular dispersion of benzophenone tetracarboxylic acid-diethylester and m-phenylene diamine components whereas the B-staged material comprises a equimolar solution mixture of the diethylester of benzophenone tetracarboxylic acid and m-phenylene diamine in N-methyl pyrrolidone which is heated for two hours at 150° C. to form a precipitate of polyimide particles which are subsequently cured at 300° C. for four hours. A mixture of the A-staged product and the B-staged product is heated in a mold for several hours at elevated temperatures to produce polyimide foams.

Lovejoy, U.S. Pat. No. 4,107,125 describes a polyimide polymeric material of a cross-linked combination of two linear aromatic polyimide polymers exhibiting a retention of physical properties at high temperatures. In one example base resins are formed from 4,4'-oxydianiline (ODA) and 3,3', 4,4'-phenonetetracarboxylic dianhydride (BTDA). A 2:1 ODA:BTDA polymer having a molecular weight of 929 is combined with a resin based on 100:103 ODA:BTDA having a molecular weight of about 16,000, and reacted initially at a temperature of 410° C. and a pressure of 5,000 psi for 20 minutes followed by subsequent heating at about 400° C. for about three hours to complete the molding and effect a cross-linking reaction.

Yokota et al., *Polyimides: Materials, Chemistry and Characterization*, pp. 13–24 describes a method for preparing high modulus, high strength polyimide/polyimide molecular composite films from a first polyamic acid based on BTDA and phenylene diamine (PDA) and a second, polyamic acid based on BTDA and 3,3'-diaminobenzophenone. Solutions of the polyamic acids were mixed, cast into films, the dried films stretched after which they were imidized for 250° C. at two hours in vacuuo followed by annealing at 330° for two hours in vacuuo. Other polyamic acid blends were also prepared as films in the same manner. BTDA/PDA-BTDA/DDK films when evaluated by optical micrograph exhibit phase separated domains which suggest that the films stretched over 40% produce microdomains of each polyamic acid and the phase separation significantly affects mechanical properties. Comparable, results were obtained for other blends.

Mita et al., *Polyimides: Materials, Chemistry and charaterization*, pp. 1–12, Elsevier Science Publishers BV (1989) describe high modulus, high strength polyimides based on molecular composites of BPDA-PDA polyamic acid blended with BPDA-ODA. The physical properties of films of these precursors which are converted into mixed polyimides is considerably improved if the films are stretched before curing.

KEVLAR (Trademark) fibers comprise a polyamide fiber consisting of an outer layer or skin and a core. Sometimes these fibers are employed in the electronics industry as a substitute for glass fiber reinforcement in Clark Boards, because glass has a high dielectric constant and circuit boards based on epoxy resin/glass fiber composites have an overall high dielectric constant resulting in high energy consumption. By substituting KEVLAR (Trademark) fibers for the glass fibers, these problems are minimized. High thermal expansion coefficients which make direct chip attachment difficult is also remedied to some degree. One of the difficulties encountered, however, in substituting KEVLAR fibers for glass in these applications is that the skin and core of KEVLAR are not well attached. These composites exhibit mechanical failure such as delamination of the epoxy resin from the fibers. Accordingly, high strength fibers which could be substituted for KEVLAR fibers in these applications would be desirable.

Accordingly, it is an object of the present invention to overcome these and other difficulties encountered in the prior art.

It is the further object of the present invention to provide a method to convert a precursor polymer mixture which phase separates from other components in the mixture at some time during polymer processing and thus forms a subsequent polymer which exhibits a multiphase structure comprising polymer molecules having the same chemical structure where the phases further comprise different morphological states.

It is a further object of the present invention to provide a method for forming a polymer which exhibits such a multiphase structure in order to improve the physical properties of the resulting polymer.

It is also an object of the present invention to provide a method of forming a polymer which exhibits such a multiphase structure having improved tensile strength.

It is a further object of the present invention to form a polymer which exhibits such a multiphase structure where said structure is either a film or a fiber having improved physical properties such as improved tensile strength.

It is a further object of the present invention to provide a method of forming a polymer from precursors that do not undergo exchange reactions to form random copolymers but to conduct such reaction so that a true multiphase structure is obtained.

It is a further object of the present invention to provide a method of forming such a polymer where said precursors are polyimide precursors, phenolic resin precursors, epoxy resin precursors or polyurethane precursors, or polymers which can be considered precursors because they can be converted through heat, light or other means into a polymer of different structure, but especially polyimide precursors.

SUMMARY OF THE INVENTION

These and other objects have been achieved by the present invention which comprises a novel method for manufacturing polymers having the same chemical structure and multiphases where each phase has a different morphology. Polymer precursors having different reaction rates or are blocked during part of the processing are reacted. To specifically improve the ultimate tensile strength, a stressing force is applied in one or all reaction steps until the reaction is complete.

DETAILED DESCRIPTION OF THE INVENTION

The present invention comprises a method of forming a polymer which exhibits a multiphase structure comprising polymer molecules having the same chemical structure where the phases further comprise different morphological states. The method of the invention is especially applicable to forming such polymer molecules having the same chemical structure which comprise homopolymers.

In this method, a mixture of precursors of the step reaction polymer is formed wherein at least one of the precursors has a reaction rate higher than the other precursor or precursors in the mixture.

The precursor having the highest reaction rate is reacted to form a composite of a polymer and the unconverted precursors. To specifically obtain high strength materials, stress is applied after the first precursor is converted and throughout the conversion of the next precursor in the composite. The process is repeated until all of the precursors in the composite are converted.

In order to take advantage of the different reaction rates of the various polymer precursors employed according to the method of the present invention the various precursors employed can be reacted or converted at different temperatures in order to shorten the time for the overall polymerization reaction.

After a mixture of the precursors of the polymer is obtained, the precursor having the highest reaction rate is converted to obtain a composite of a polymer and the precursors that are not reacted. Stress is applied if treatment for high ultimate strength is desired.

The stress applied may be either compressive stress or tensile stress, the latter being preferred. In any event, in the preferred embodiment of the invention, the application of stress to the converted precursor in the composite is applied along substantially one axis of orientation especially where the stress comprises tensile stress. After application of the stress, the reaction is continued so that the precursor or precursors in the composite that are not reacted are converted to a polymer or polymers so that a multiphase structure having different morphological states is obtained.

The application of stress and the reaction of the unconverted precursor or precursors in the composite in one embodiment is conducted at substantially the same time. Thus, after stress is applied to the composite such as a stretching force, the unreacted precursor or precursors may be subsequently converted or converted at substantially the same time that the stress is applied.

Where more than one stress is applied to the composite, and where the composite contains one or more precursors that are not converted, the additional stress can be applied along substantially one axis of orientation, either parallel to the first axis of stress orientation or at an angle to it. These two axes of orientation will either lie in one plane or separate planes where the separate planes or separate axes are either parallel to one another or at an angle to one another. When a third stress is applied along an axis of orientation it may be at an angle to one or both of the other axes of stress orientation or parallel to them. When all three axes of stress orientation lie in separate planes, and these planes in turn are each at an angle to one another such as a right angle, three dimensional stressing will result. Where all of the axes of stress orientation lie in the same plane or parallel planes and two axes or sets of axes are at an angle to one another the polymer will be biaxially oriented which is advantageous in film applications since this orientation results in high film strength. It is also within the scope of the present invention to apply stress to the composite along multiple (i.e. more than one, two, three etc.) axes of orientation especially those lying in the same plane or parallel planes where the composite contains one or more precursors and especially two or more precursors.

Where the polymer is in a fiber form, stress orientation of the polymer molecules along the axis of the fiber also improves its strength.

Although the inventors do not wish to be limited by any theory, it is believed that upon curing the first polymer precursor to obtain a composite of a polymer and the precursor or precursors that are not converted, domains of one precursor or precursors are embedded on regions of the polymer and upon the application of stress such as tensile stress to the polymer, the molecules of the unconverted precursor or precursors are aligned and cured. The processes of applying stress and curing can be repeated until all of the precursor or precursors in the composite are converted. This results in a polymer material comprising either a highly ordered phase which usually will be highly crystalline embedded within a less ordered phase which may also be crystalline, but to a lesser degree or a polymeric material having a plurality of highly ordered phases such as crystalline phases in a composite form. The ratio of the phases can be tailored by changing the composition, the degree of mixing, and the use of block or graft copolymers, made of different precursors, to the same polymer. The polymer ultimately obtained is thereby described as having different morphological states in its various phases. This type of alignment has been found to provide a polymer material having improved physical properties.

Stress-strain measurements were conducted on a slightly stretched molecular composite produced according to the present invention based on the reaction of a polyamic acid and a polyamic acid ester. The sample was clamped during cure and the contraction of the material produces the stress. Two yield points were observed, i.e., first one phase yields and then the other. The ratio of the two phases determines where the yield points occur. This leads to a tougher material compared to either of the polyamic acid ester or the polyamic acid which are cured without forming the composite because the second phase reinforces the first phase. The stress at which the first and second yielding occur depend on the amount of each phase in the composite. The overall strength of the material was not improved, i.e. the pure polyamic acid would have a higher modulus under the same conditions but less elongation whereas the pure polyamic acid ester upon curing would have a lower modulus but a higher elongation. The properties of the composite are somewhere in between with the added benefit of toughening through the two-phase structure.

Although the invention is applicable to polymeric precursors in general, and especially polyimides, it is also applicable to phenolic resins., epoxy resins, polyurethanes or polystyrenes. Thus, in its broadest aspect, the method of the present invention is applicable to any polymer that is available in at least one soluble precursor form where the polymer itself is soluble, or at least two soluble precursor forms if the polymer itself is not soluble. In the first case, one would have a mixture of a polymer with its precursor between which phase separation is likely. Morphological composites, however, will only be obtained if under the processing conditions employed, the components of the composite show differing properties and morphologies and do not mix fully in the course of processing. Polystyrenes or other crystallizable polymers can be used if they can in turn be made into a heat or irradiation convertible precursor. Composites prepared from polystyrene precursors will exhibit toughening as will all two phase systems prepared according to the present invention and will result in a composite which is at least to some degree tougher than the corresponding one phase system.

The method of the invention is especially suitable for the manufacture of polyimides having polymer repeat units with the same chemical structure and different morphological states.

The polyimides are characterized by the presence of a phthalimide structure in the polymer backbone and are conventionally synthesized from dianhydrides and diamines to form poly(amic acid)s which are thermally or chemically cyclized to the polyimide. The intermediate polyamic acid is generally soluble whereas the cyclized polyimide is insoluble. Conventional dianhydrides employed in this respect include, but are not limited to pyromellitic dianhydride (PMDA) benzophenone-2-2',3,3'-tetracarboxylic dianhydride (BTDA), hexafluoroisopropyliden-2'2-bis (phthalic anhydride) (6 FDA) or BTDA (defined previously herein). Typical diamines include but are not limited to ODA (defined previously herein), meta-or para dianiline, 4,4'-diaminodiphenylether; 4,4'-diaminodiphenyl propane or 4,4'-diaminodiphenylmethane.

When a solution of two polyamic acids based on PMDA-ODA and BTDA-ODA when cast into a film and cured undergo exchange reactions to form a random copolymer which would have different properties than obtained for a true blend. In order to avoid this, the method of the present invention in one embodiment has been applied to polyimide blends by mixing polyamic acid and polyamic acid ester solutions. In these mixtures, exchange reactions cannot occur and real blends are obtained. A blend, by definition, must consist of at least two polymers with differing structures; however, it is now possible to obtain a true blend from polymers which have identical chemical structures once converted to the final product.

Two precursors comprising polyamic acid (PAA) and polyamic acid ethyl ester (PAETE) both based on PMDA-ODA each will form PMDA-ODA-polyimide upon curing. Solutions of these precursors are mixed, cast into a film, the film dried, to thereby obtain a material in which amic acid domains are imbedded in amic acid ester domains or vice versa depending on the ratios of PAA to PAETE of these two precursors. Since the PAA has a faster reaction rate (i.e. it imidizes at lower temperatures than PAETE), it can be imidized first, the sample stretched and then the PAETE in the sample imidized so the sample can be fully cured under strain which leads to highly oriented PMDA-ODA polyimide domains in a less ordered matrix of the same material. These materials are composite in phase rather than in material. It has been found that by the proper processing of these materials, the physical properties are outstanding and not available by any other means. For example, this new class of composite materials will have enhanced moduli and will have enhanced fracture toughness because of the two phase structure.

These multiphase structures comprising different morphological states have significant advantages over conventional composites in which a polyimide fiber is embedded in the PAETE or PAA because it will be easier to extrude and process the novel morphological composite. Further, .the adhesion between phases will be excellent because of some intermixing of the PAA and PAETE at the interface. This cannot occur if fully imidized fibers are used to produce a blend with one or more precursors. The same intermixing of the PAA and PAETE can be obtained when a film or thicker article is made according to the invention.

The various polyimides that may be employed according to the invention in addition to those based on the aforementioned dianhydrides and diamines are disclosed and described further by Edwards, U.S. Pat. No. 3,179,614; Lindsey, U.S. Pat. No. 3,361,589; Dunphy et al., U.S. Pat. No. 3,770,573 all of which are incorporated herein by reference.

These polyimides are conventionally formed from polyamic acid e.g. from the partial reaction of the diamine and dicarboxylic acid. Other polyimide precursors can be produced by reacting of dicarboxylic anhydrides with alcohols, conversion of the corresponding acid chloride and reaction with diamines. The polyamic acid esters may also be prepared by any art known method for esterifying the polyamic acid. Any monohydroxy compound may be used to esterify the polyamic acid such as alkanols having up to about eight carbon atoms including the various straight chain and branched chain configurations thereof e.g. methanol, ethanol, isobutanol, t-butanol and the like. Different esters would be employed, especially when more than two precursors are utilized, because longer chain esters will show more phase separation in a mixture with unesterified polyamic acid than shorter chain esters. Modifying the ester therefore allows for tailoring the composite polyamic acid block co-polymers where the blocks are two types of precursors for one and the same polymer.

Any other polyimide precursors are useable for the invention. Some of these are polyamic acid salts with functionalized or unfunctionalized low molecular weight amines such as those used in photosensitive polyimides, nitrophenol esters, isoimides, isocyanates and the like. Any art or known alternate method for the preparation of the polyimide precursors and the polyimides may be employed such as those described by Wilson et al., *Polyimides*, Chapman & Hall, 1990 and especially the chapter therein by T. Takekoshi "Other Synthetic Routes to Polyimides" including the citation to literature and patents in that chapter all of which is incorporated herein by reference. The one criterion in all mixtures of precursors employed according to the method of the present invention is that they must exhibit some degree of incompatability for a given precursor pair after conversion or partial conversion of one to a more nearly completely polymerized form, and the precursors are then converted to fully cured polymers at different reaction rates.

To obtain morphological composites in this case as well as in the case of any of the other compounds noted herein and their art known equivalents, there needs to be some phase separation between the precursors or between a precursor and an already converted polymer. Furthermore, if incompatable, the force-producing phase separation, develops during the reaction of one of the precursors there then has to be enough mobility in the system to allow phase separation to occur, or at least phase separation on a small scale. The precursors are also selected to take into account this phenomenon as well.

Morphological composites can also be made from phenolic resin mixtures employing the method of the invention where the phenolic hydroxy group in one resin component has been converted into the corresponding formic acid ester. A low molecular weight monofunctional organic compound i.e. acids can be employed in this respect. The formic ester group can be removed by irradiation at 270nm. Morphological composites are obtained by curing the unprotected phenolic resin, removing the protection and further cure of the resulting resin.

The phenolic resins that may be employed in this regard comprise either the base catalyzed one step reactions of phenol and formaldehyde or various equivalents of phenol such as t-butyl phenol, para-phenyl phenol, cresol, catechol and the like. These resins are well known in the art and the methods of curing them are also well known and well defined. It should be noted that the two-step resins are generally cured with an amine curing agent such as hexamethylenetetramine.

Epoxy resins may also be employed such as those based on the condensations of bis-phenol A or bis-phenol F with epichlorohydrin and the various art known epoxy resins which are further described in Kirk-Othmer, *Encyclopedia of Chemical Technology*, 3rd Edition, Vol. 9, pp. 267-290 which is incorporated herein by reference. These epoxy resins are generally cured by reacting the oxirane oxygen with polyfunctional curing agents containing reactive hydrogen atoms such as polyhydroxy compounds, polycarboxylic acids or polyamines.

These polyfunctional curing agents can be modified so they are completely or partially reacted and the reacted curing agent in turn used with an unreacted curing agent. Both the partially reacted and unreacted epoxy curing agents, as defined herein, are the polymer precursors for the cured epoxy resin. Thus, by way of illustration, a diamine curing agent may be converted into a monoamide (partially reacted curing agent) by reacting the amine with a low molecular weight organic acid such as formic acid or acetic acid by slowly adding the acid to a stoichiometric excess of the amine at slightly elevated temperatures. The amine-amide thus obtained can be mixed with the same diamine (unreacted curing agent) starting material and the mixture in turn can be used to cure an epoxy resin. In the first stage of cure, the diamine is employed in an amount less than the stoichiometric quantity required to react with the epoxy resin so that the diamine would react with some of the oxirane groups on the epoxy to form a composite and stress applied after which further curing can be effected so that the amide would also react with the oxirane groups. Alternatively, low molecular weight acids can be reacted with a diamine to form a diamide and the diamide in turn utilized in polymerizing the diamine reacted with a stoichiometric excess of the epoxy resin. High molecular weight diamines are of particular interest since they impart flexibility to the epoxy resin such as those based on fatty acids and are commercially available as Versamid (Trademark) epoxy curing agents.

Similar epoxy resin reactions can be effected with polycarboxylic acid and poly hydroxy curing agents e.g. a dicarboxylic acid would be converted to a mono- or di-ester with a low molecular weight alcohol and a diol converted to a mono- or di-ester with a low molecular weight acid. These esters or half-esters would then be mixed with the unreacted acid or diol, as the case may be, and the mixture reacted with an epoxy resin to obtain a partially reacted epoxy, stress applied and the ester or part ester reacted with the remaining epoxy. Again, as with the acid amide or amide, the half ester or ester will be described as precursors for the ultimate polymer that is obtained.

Although in the foregoing examples, the product produced was described as being processed with the application of stress, epoxy resins made with the components as described herein which contain macroscopic inhomogeneities (i.e. microcomposites) can be used without applied stress. These systems with such inhomogeneities will have increased impact strength due to the two phase system which may be sufficient so that the application of stress would not necessarily be required to obtain a certain acceptable impact strength.

Any of the other polymers described herein as being suitable for the practice of the present invention and their art known equivalents which develop macroscopic inhomogeneities could also be employed without the application of stress due to the increased impact strength the two phase system would produce.

Polyurethane resins may also be employed in the method of the present invention and are generally synthesized by the reaction of a polyisocyanate compound with a polyol.

The polyisocyanates generally employed are the diisocyanates such as para-phenyl diisocyanate (PPDI); 1,6-hexamethylenediisocyanate (HDI); polymethylene polyphenylisocyanate (PMDI); 4,4'-methylene-bis (phenylisocyanate) (MDI); toluene diisocyanate (TDI) [a 65:35 mixture of 2,4- and 2,6-TDI]; 1,5-naphthalene diisocyanate (NDI); bitolylene diisocyanate (TODI); methylenebis (cyclohexylisocyanate) ($H_{12}$ MDI); isophorone diisocyanate (IPDI); HDI-biuret; (obtained by the treatment of HDI with water); isophorone-based isomeric trimethylhexamethylene diisocyanates (TMDI); m-xylene diisocyanate (XDI) and 1,3-bis (isocyanatomethyl) cyclohexane ($H_6$XDI).

The foregoing isocyanates may be blocked by reacting all isocyanate groups with a suitable blocking agent containing an active hydrogen e.g. caprolactam, acetone oxime or phenol. The blocking agent is removed by a thermal unblocking process and the blocking agent thus removed may be incorporated into the polymer if sufficiently compatible or removed by the application of a vacuum to the polymer as it is formed. The following is a reaction scheme showing the removal of caprolactam from caprolactam blocked IPDI:

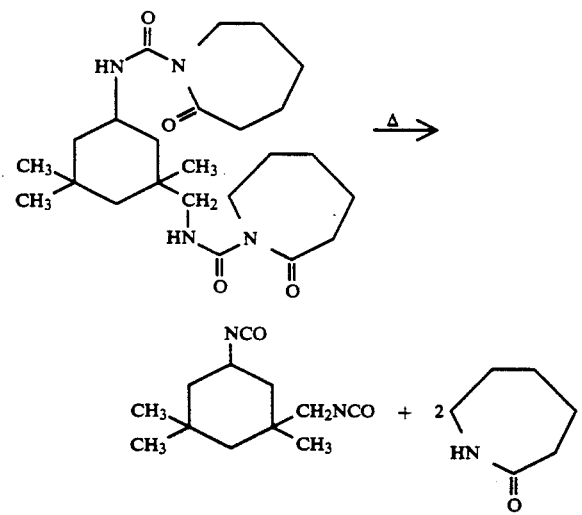

More importantly, bis(cyclic ureas) are preferred blocked aliphatic diisocyanates since no blocking agent is released upon heating in the conversion to a compound having reactive isocyanate groups. The production of aliphatic diisocyanates from bis(cyclic ureas) is a ring-opening reaction as shown below:

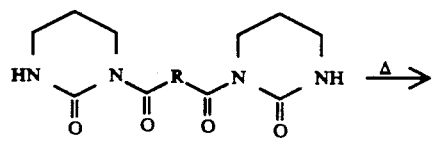

where R is an organo group such as alkylene group having up to about 5 carbon atoms or an aromatic group all of which are known in the art.

The various polyhydroxy compounds that may be employed in the manufacture of polyurethanes comprise polyether polyols or polyester polyols which are known in the art. A few of these glycols comprise poly(ethylene glycol) (PEG); poly(propylene glycol) (PPG); poly(tetramethylene glycol) (PTMG) and the like. These polyols may also be end capped with ester groups to change their reaction rates with the isocyanate.

The reaction preferably is conducted with a catalyst such as an amine and especially a tertiary amine or a tin catalyst such as di-n-butyltin diacetate or mixtures of amines with tin catalysts all of which are well known in the art. Other catalysts based on cobalt, lead, manganese, zinc and zirconium are employed generally as a cocatalyst with amines and tin compounds. Various mixtures of catalysts and cocatalysts can be used all of which are known in the art.

In practicing the method of the present invention with the foregoing polyisocyanates and polyols, mixtures of the polyisocyanate with the blocked polyisocyanate are prepared and then mixed with stoichiometric amounts of a polyol that has a catalyst combined with it. Again, bis(cyclic ureas) are the ideally blocked diisocyanates employed in this regard. Once formed, the mixture reacts substantially at room temperature and is stressed after which heat is applied in order to initiate the ring-opening reaction of the bis(cyclic urea) or to remove the blocking agent from the blocked isocyanate (e.g. caprolactam, acetone oxime or phenol as the case may be). Preferably tensile stressing is applied to the polymer and precursor composite and the urethane forming reaction proceeds.

The ratios of the various polymer precursors can be adjusted depending on the end properties which are to be achieved and generally are utilized on an equimolar basis ±95% an equimolar basis ±about 50% and an equimolar basis ±about 20% and especially an equimolar basis ±about 10% by which it is intended that where two or more precursors are employed, they may be utilized in equimolar ratios or any one precursor may be present in an amount greater or lesser than the others by about 95%, 50%, 20% or 10% on a molar basis. Where the precursors are epoxy, urethane or similar precursors used in the manufacture of a polymer from two or more components that react with one another the total amount of precursor to the other reactive components will be a 1:1 molar basis ±about 10%.

As noted previously, in carrying out the method of the present invention the axes of stress orientation applied where more than one application of stress is employed, can be in the same direction or at angles to any other of the axes of orientation which may be effected where there is a mixture of two or more precursors and two or more polymerization steps.

Alternately, the multiphase structure comprising polymer molecules having different morphological states can be made whereby the last precursor to be polymerized is not completely polymerized but is stress oriented prior to the last polymerization step. Two of these structures e.g. films may then be laminated one to the other so that the incompletely polymerized precursors of each are available to react with each other and thereby bond the two structures to one another by a cross-linking reaction. The axes of stress orientation of each individual structure or film may run in the same direction or may be at an angle to one another such as right angles to one another a 45° angle to one another and the like. Naturally, more than two structures may be laminated in this manner so that the laminate ultimately obtained may have as many as 10–15 layers prepared according to the process of the invention with the axes of orientation running in as many directions or 2, 3 or 4 directions depending on the application for the structure.

Alternately, where more than two precursors are utilized in the method of the present invention for the manufacture of a single structure such as a film, stressing can be applied to the single structure as each precursor is polymerized so that, by way of example where four precursors are utilized the process will proceed through four polymerizations and three applications of stress, the axes of orientation of each application of stress running in the same direction or at angles to one another.

As noted previously, a novel product has been obtained by the process of the present invention, the exact structure of which has not been defined, it being believed that the resultant article is unique and cannot be produced by any other method. The product produced by the method of the invention therefore is also considered to be novel and inventive.

The products produced by the method of the present invention have many applications one of which is the formation of films having high impact resistance especially films that employ a plurality of precursors and during polymerization stress is applied to the composite along substantially one axis of orientation and in the successive polymerizations and applications of stress, the stress is applied in substantially one axis of orientation that is at an angle to the other axes of orientation.

Films manufactured from PAA and PAETE both based on PMDA-ODA have been demonstrated to have a unique yielding behavior and therefore are tougher than the chemically identical polyimide material based on PMDA-ODA formed from one precursor. This chemically identical material made according to the method of the present invention has been shown to be effective in a membrane for separating methane and nitrogen. The film lets nitrogen gas through and hinders the methane. With a stronger polyimide material the membrane is manufactured in a thinner configuration and is more permeable to the nitrogen gas, consequently less power is needed to compress the methane/nitrogen mixture before separation. Without being limited to any theory, it is believed that the boundaries between the phases of the polyimides produced according to the method of the present invention have a higher concentration free volume which allows for a higher throughput of gas.

High strength fibers can also be produced from low TCE (thermal coefficient of expansion) polyimides morphological composites with at least one precursor converted under stress and are ideal for printed circuit board fabrication particularly if a polyimide resin is used in the manufacture of the circuit board although such fibers can also be employed in circuit boards manufactured from epoxy resins, phenolic resins and the art known equivalents thereof. Adhesion is improved and no skin-core effect is expected.

The RIE and laser etch resistance of such a material would be homogeneous since the chemical structure of each phase is identical and thus domain size would not limit line width.

Low thermal coefficient of expansion (TCE) polyimides are polyimides with a particularly stiff backbone which is characterized by long persistence length and usually leads to low TCE's. Examples are BPDA-PDA (TCE: 5 ppm/C; PDA is p-phenylene diamine), PMDA-PDA (TCE: -5ppm/C), BPDA-PFMB (TCE: in the order of 15 ppm/C; PFMB is 2,2'bis(trifluoro methyl) biphenyl-4,4'-diamine [or 2,2'bis(PerFluoro Methyl) Biphenyl-4,4'diamine)].

Partial esters of the foregoing precursors of the low TCE polyimide materials can be prepared in an art known way and a mixture of the partially esterified precursor and an unesterified precursor can be utilized for producing the fibers. The method employed generally comprises the use of such precursors and the method of the present invention for obtaining the morphological composites described herein but in a fiber forming process. Typical polyimide fibers may be produced in this regard by employing the process of Bell et al., *J. Poly. Sci.*, 14, 2275 (1976). Polyimide fibers thus prepared can be substituted for KEVLAR (Trademark) with reinforcement for Clark Boards and thereby the problem of mechanical failure such as delamination of the epoxy resin from the KEVLAR fibers can be avoided, the latter being due to the skin and core of KEVLAR fibers not being well attached.

Although the invention has been described by reference to some embodiments, it is not intended that the novel method and the product produced by this method be limited thereby but that modifications thereof are intended to be included as falling within the true spirit and scope of the foregoing disclosure and the following claims.

Having thus described our invention, what we claim as new, and desire to secure by Letters Patent is:

1. A method of preparing a polymer composite comprising an integral structure having a continuous phase and at least one discontinuous phase, said discontinuous phase being constituted by a multiplicity of separated domains, said continuous phase and said discontinuous phase each consisting essentially of polymeric material of the same chemical constitution, said continuous and discontinuous phases exhibiting a different morphological characteristic, said method comprising:
   (a) forming a mixture of reactant precursors to said polymeric material, at least one of said precursors having a reaction rate higher than the other precursor or precursors in said mixture;
   (b) reacting said precursor having the highest reaction rate under conditions effective to obtain a composite comprising a continuous-polymer phase and a discontinuous phase of unreacted precursors;
   (c) simultaneously or sequentially applying compressive or tensile stress to said composite effective to improve the ultimate tensile strength of said composite; and
   (d) simultaneously or subsequently to application of said stress to said composite, reacting said unreacted precursors in said discontinuous phase under conditions effective to convert said precursors to polymeric material.

2. The method of claim 1 where said stress comprises tensile stress applied along substantially one axis of orientation.

3. The method of claim 1 where said stress comprises tensile stress applied along substantially one axis of orientation.

4. The method of claim 1 where said stress comprises tensile stress applied along substantially one axis of orientation as to each precursor that is reacted and further, the axis of orientation of each sequential application of stress is at an angle to the other axes of orientation.

5. The method of claim 3 where the axes of orientation are substantially planar.

6. The method of claim 4 where the axes of orientation are substantially planar.

7. The method of claim 6 where said stress is applied to provide a biaxially-oriented, multiphase structure wherein each phase of polymeric material exhibits a different morphological characteristic.

8. The method of claim 4 wherein said multiphase structure is a film.

9. The method of claim 1 wherein said polymer is a polyimide, phenolic resin, epoxy resin, polyurethane or a semi-crystalline polystyrene.

10. The method of claim 9 wherein part of said polyimide precursor is a step-reaction polymer precursor partially esterified with a monofunctional organic hydroxy compound to obtain a precursor having a reaction rate different from said other precursor or precursors.

11. The method of claim 10 wherein the ratio of said precursors to one another is on a 1:1 molar basis ± about 95%.

12. The method of claim 1 wherein said precursor is a polyimide precursor.

13. The method of claim 12 wherein said precursor is a polyamic acid ester of polyamic acid and a low molecular weight monofunctional organic hydroxy compound or (b) a polyamic acid salt of polyamic acid and a low molecular weight amine to obtain a precursor having a reaction rate different from said other precursor or precursors.

14. The method of claim 2 wherein said polymer precursor is a polyamic acid ester of polyamic acid and a low molecular weight monofunctional organic hydroxy compound or (b) a polyamic acid salt of polyamic acid and a low molecular weight amine to obtain a precursor having a reaction rate different from said other precursor or precursors.

15. The method of claim 3 wherein said polymer precursor is a polyamic acid ester of polyamic acid and a low molecular weight monofunctional organic hydroxy compound or (b) a polyamic acid salt of polyamic acid and a low molecular weight amine to obtain a precursor having a reaction rate different from said other precursor or precursors.

16. The method of claim 4 wherein said polymer precursor is a polyamic acid ester of polyamic acid and a low molecular weight monofunctional organic hydroxy compound or (b) a polyamic acid slat of polyamic acid and a low molecular weight amine to obtain a precursor having a reaction rate different from said other precursor or precursors.

17. The method of claim 5 wherein said polymer precursor is a polyamic acid ester of polyamic acid and a low molecular weight monofunctional organic hydroxy compound or (b) a polyamic acid slat of polyamic acid and a low molecular weight amine to obtain a precursor having a reaction rate different from said other precursor or precursors.

18. The method of claim 17 wherein said multiphase structure having different morphological characteristics comprises a film.

19. The method of claim 17 wherein said multiphase structure having different morphological characteristics comprises a fiber.

20. A product produced by the method of claim 1.

21. A polymer composite comprising an integral structure having a continuous phase and at least one discontinuous phase, said discontinuous phase being constituted phase and said discontinuous phase each consisting essentially of polymeric material of substantially the same chemical constitution, said continuous and discontinuous phases exhibiting a different crystallinity characteristic.

22. The polymer composite of claim 21 where said polymeric material is a polyimide.

23. The polymer composite of claim 21 where said polymeric material is a phenolic polymer.

24. The polymer composite of claim 21 where said polymeric material is an epoxy polymer.

25. The polymer composite of claim 21 where said polymeric material is a polyurethane.

26. The polymer composite of claim 21 where said polymeric material is a semi-crystalline polystyrene.

27. The composite of claim 21, oriented in at least one dimension.

28. The polymer composite of claim 27 wherein each phase has the same degree of crystallinity but different morphology.

29. A film formed of the composite of claim 27.

30. A laminate of two or more of the composites of claim 21.

31. A gas separation membrane comprising the composite of claim 29.

32. The composite of claim 21 in the form of an oriented fiber constituted from a low thermal coefficient of expansion polyimide.

33. A printed circuit board comprising the composite of claim 32.

* * * * *

UNITED STATES PATENT AND TRADEMARK OFFICE
CERTIFICATE OF CORRECTION

PATENT NO. : 5,288,842  
DATED : February 22, 1994  
INVENTOR(S) : Claudius Feger, et al.

Page 1 of 2

It is certified that error appears in the above-indentified patent and that said Letters Patent is hereby corrected as shown below:

On the Title Page, Section [75], line 4: after "of" insert --New York--

Column 2, line 13: after "4'-" insert --benzo--

Column 6, line 55: ".the" should read --the--

Column 13, line 40, Claim 13: after "is" insert --(a)--

Column 13, line 46, Claim 14: after "is" insert --(a)--

Column 13, line 54, Claim 15: after "is" insert --(a)--

Column 14, line 4, Claim 16: after "is" insert --(a)--

Column 14, line 6, Claim 16: "slat" should read --salt--

UNITED STATES PATENT AND TRADEMARK OFFICE
CERTIFICATE OF CORRECTION

PATENT NO. : 5,288,842
DATED : February 22, 1994
INVENTOR(S) : Claudius Feger, et al.

It is certified that error appears in the above-indentified patent and that said Letters Patent is hereby corrected as shown below:

Column 14, line 11, Claim 17: after "is" insert --(a)--

Column 14, line 13, Claim 17: "slat" should read --salt--

Column 14, line 27, Claim 27: after "constituted" insert --by a multiplicity of separated domains, said continuous--

Signed and Sealed this

Twenty-third Day of May, 1995

Attest:

Attesting Officer

BRUCE LEHMAN

Commissioner of Patents and Trademarks